July 22, 1969  R. M. BARLOW  3,456,618
ANIMAL CAGE RACK AND WATER BOTTLE SUPPORT
Filed Dec. 9, 1966  2 Sheets-Sheet 1

INVENTOR.
RONALD M. BARLOW
BY Bruns and Jenney
Att'ys.

July 22, 1969   R. M. BARLOW   3,456,618
ANIMAL CAGE RACK AND WATER BOTTLE SUPPORT
Filed Dec. 9, 1966   2 Sheets-Sheet 2
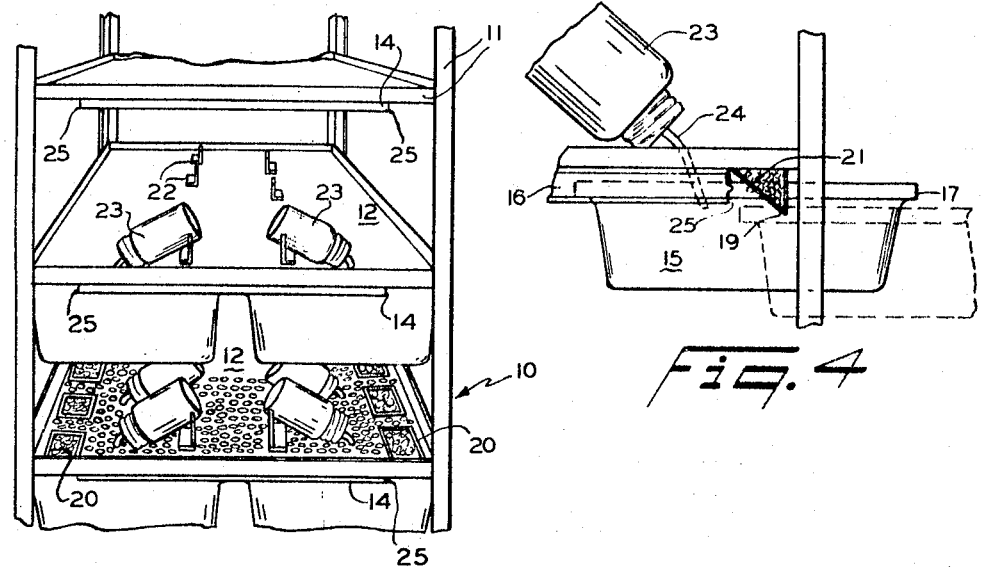
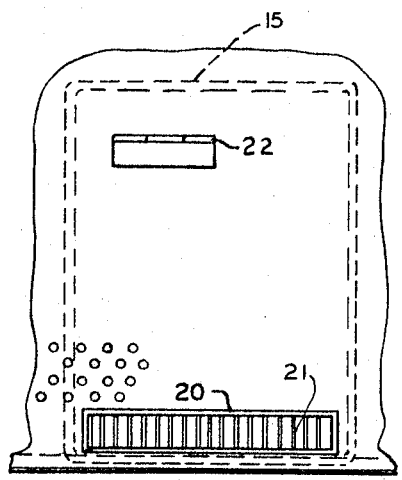
INVENTOR.
RONALD M. BARLOW
BY Bruns and Jenney
Att'ys

United States Patent Office 3,456,618
Patented July 22, 1969

3,456,618
ANIMAL CAGE RACK AND WATER BOTTLE SUPPORT
Ronald M. Barlow, 1031 Cumberland Ave.,
Syracuse, N.Y. 13210
Filed Dec. 9, 1966, Ser. No. 600,595
Int. Cl. A01k 1/00; A47f 7/28
U.S. Cl. 119—18
2 Claims

ABSTRACT OF THE DISCLOSURE

A rack having a plurality of open-mesh rigid shelves beneath which a plurality of pairs of parallel tracks slidingly secure a plurality of open-topped, drawer-like cages for small animals. Over the front of each drawer a manger-like feed through is provided in the shelf and means are provided on the shelf for supporting a water bottle over each cage so that a lick-tube therefrom may extend down into the cage.

---

This invention relates to animal cages and particularly to such cages in racks having a plurality of cages disposed therein.

Heretofore rack cages for small animals have comprised a plurality of separate cages disposed on a rack, each cage with a top or front opening through which food and water are introduced into the cage. To clean the cages, each animal has to be shifted to another cage requiring opening of the cage to be cleaned and then opening the new cage to which the animal is shifted.

The cage rack of the present invention is peculiarly adapted for the breeding of small rodents such as rats, mice, hamsters, and gerbils but obviously is suited for housing any small laboratory animal. The rack has drawer-type cages which are easily kept clean and are interchangeable. Provision is made for the supplying of water and food from outside the cages without opening them.

The principal object of the invention is to provide a cage, a plurality of which may be disposed in a rack, each cage being easily removable for cleaning while the animal therein is quickly transferred to another cage substituted for the one removed.

Another important object is to provide a cage rack having means for feeding and watering the animal in each cage without opening the cage.

Still another object is to provide a cage which may be kept sterile and may be easily handled.

A further object is to provide a cage rack having a plurality of drawer-type cages which may be drawn forward for inspection of the animals inside but which cannot be removed from the rack until a locking device has been removed.

Other objects and advantages will become apparent from the following description in conjunction with the appended drawings, in which:

FIGURE 3 is an enlarged fragmentary perspective view of a portion of the rack and cages, as viewed from one end;

FIGURE 4 is a fragmentary view of a portion of the rack and one cage in side elevation;

FIGURE 5 is a fragmentary view of the rack and one cage in front elevation; and

FIGURE 6 is a fragmentary view of a portion of the rack and one cage in plan.

Figure 1:
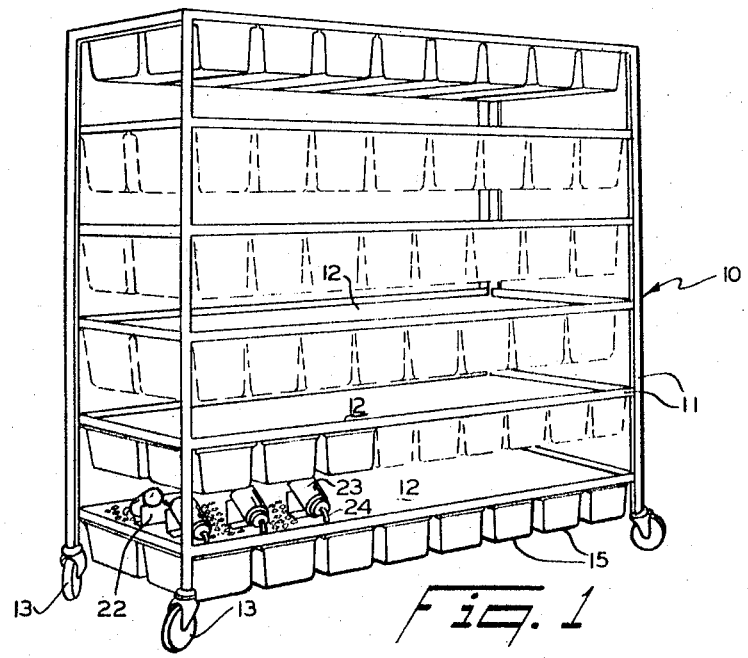
FIGURE 1 is a fragmentary perspective view of a rack with a plurality of cages according to the invention, as viewed from the front and one end.

In the drawings the rack 10 comprises a supporting structure or frame 11 of welded angle iron construction supporting a plurality of shelves 12, one above the other in conventional manner. The rack may be provided with casters or wheels 13 so that it may be easily moved about.

Each shelf 12 is of open mesh construction, such as perforate sheet steel, expanded metal or metal mesh.

Under each shelf are a plurality of pairs of parallel tracks 14 in which the drawer-like cages 15 are slidingly engaged. The track 14 for one cage 15, is in the same member 16 as the track 14 for the adjacent cage 15, as best seen in FIGURE 5. Members 16 are secured to shelf 12 by welding or by fasteners such as screws or bolts, and extend from front to rear of rack 10 so that one cage 15 may be slid in from the front of the rack and another from the rear of the rack.

The cages are preferably a unitary molded plastic receptacle, preferably of high density polyethylene, having front and back ends, opposed sides, and bottom, and having an open top. Along the top of each of the two opposed sides a flange 17 is formed for engagement in the track 14.

Along the front and back of each shelf there is an opening 18 (FIG. 2) over each cage into which is fitted a manger-like trough member 19 (FIG. 4) secured to the shelf 12 by moldings 20 bolted to the shelf. The downwardly sloping side 21 of the trough is slotted so that food in pellet or biscuit form may be placed in the trough from above and the animal occupant of cage 12 can reach the food through the slotted side 21.

Above each cage 15 a bottle holder 22 is secured to shelf 12 by welding or otherwise, so that a water bottle 23 may be placed thereon with a stainless steel lick tube 24 extending from the top thereof down through the open mesh shelf 12 into cage 15 so that the animal has a constant supply of water.

Figure 2:
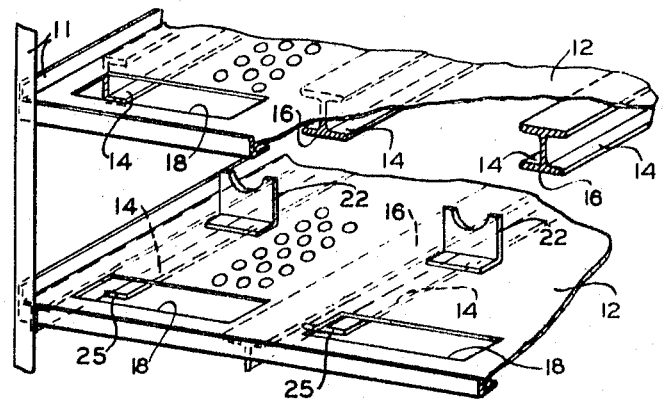
FIGURE 2 is an enlarged fragmentary diagrammatic perspective view of a portion of the rack of FIGURE 1.

Each track 14 has a drawer supporting portion relieved at 25, FIGURES 2, 3 and 4, at the front and back of the rack so that the cage 15 can be drawn out from the rack and dropped downward, as indicated in broken lines in FIGURE 4, before the back of the cage is obstructed by the trough member 19. The lick tube 24, however, is placed so that it prevents drawing the cage forward to this removal point. The lick tube therefore prevents inadvertent removal of the cage and bottle 23 must be removed from its rack before the cage is removed from the rack. FIGURE 2 shows the track members of the upper shelf in section to show their cross-sectional configuration and the ends of the track members of the lower shelf are shown in full.

In operation, an animal may be placed in each cage 15 and troughs 19 may be supplied with food at any time without opening any cage. Water may be likewise supplied at any time by placing bottle 23 in its holder.

To clean a cage 15, bottle 23 is first removed from its holder and placed upright on shelf 12. The cage is then drawn forward until it drops from the tracks 14, the animal occupant is hand-held, a new cage 15 is substituted, and the animal returned in its new cage and bottle replaced.

It will be apparent that a compact arrangement of cages has been provided at low cost. Individual closures for each cage are eliminated. Food and water may be provided without opening the cages and the cleaning of the cages have been simplified. In addition, the rack construction may be easily modified by providing filters at the ends, top, front and back of the rack so that animals may be kept in a sterile atmosphere.

As will be apparent to those familiar with the art, the invention may be embodied in other specific forms without departing from the spirit or essential characteristics thereof. The embodiment disclosed therefore is to be considered in all respects as illustrative, rather than restrictive.

What is claimed is:

1. In a caging device, a unitary rack having a plurality of tiered shelves of perforate rigid material, a plurality of parallel tracks secured to the bottom of each shelf, an open-topped drawer-type cage slidingly supported at its top between each pair of adjacent tracks so as to be removable by drawing it toward the front of the rack, each cage having bottom, front, back and two opposed sides, each shelf having means over each cage for supporting a water bottle thereon with a lick-tube extending from the bottle through a perforation in the shelf into the cage, and each shelf having an open-topped trough therein over each cage adjacent the front of the shelf, the trough being formed of an open-mesh material for supporting pellet-type food therein so as to be accessible to an animal in the cage.

2. The rack defined in claim 1 characterized by having the cage supporting portion of each track terminating short of the food trough and beyond the shelf opening adapted to receive the bottle lick-tube whereby each cage may not be removed from the rack while its water bottle is in its rack but may be withdrawn by being drawn outward and dropped to clear the food trough when the lick tube is removed.

References Cited

UNITED STATES PATENTS

| | | | |
|---|---|---|---|
| 1,347,397 | 7/1920 | Newman | 119—17 |
| 1,961,391 | 6/1934 | Reedy et al. | 211—126 |
| 2,969,040 | 1/1961 | Siptrott | 119—21 |
| 3,125,068 | 3/1964 | Hampton | 119—17 |
| 3,152,698 | 10/1964 | Maddox | 211—126 |
| 3,214,030 | 10/1965 | Graham et al. | 211—71 |
| 3,225,738 | 12/1965 | Palencia | 119—18 X |
| 3,244,147 | 4/1966 | Kogeichi et al. | 119—18 |
| 3,244,359 | 4/1966 | Holland | 119—17 X |
| 3,256,859 | 6/1966 | Petti | 119—18 |
| 3,269,358 | 8/1966 | Hawley | 119—18 X |

FOREIGN PATENTS 564,438   9/1944   Great Britain.

ALDRICH F. MEDBERY, Primary Examiner

U.S. Cl. X.R.

211—126